(12) United States Patent
Oguro

(10) Patent No.: US 11,590,983 B2
(45) Date of Patent: Feb. 28, 2023

(54) VEHICLE SLIP CONTROL APPARATUS

(71) Applicant: SUBARU CORPORATION, Tokyo (JP)

(72) Inventor: Chihiro Oguro, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 184 days.

(21) Appl. No.: 16/889,113

(22) Filed: Jun. 1, 2020

(65) Prior Publication Data

US 2021/0016784 A1 Jan. 21, 2021

(30) Foreign Application Priority Data

Jul. 18, 2019 (JP) ............... JP2019-132561

(51) Int. Cl.
*B60W 40/10* (2012.01)
*B60W 30/18* (2012.01)
(Continued)

(52) U.S. Cl.
CPC ............ *B60W 40/10* (2013.01); *B60W 10/08* (2013.01); *B60W 10/10* (2013.01);
(Continued)

(58) Field of Classification Search
CPC ...... B60W 40/10; B60W 10/08; B60W 10/10; B60W 2510/08; B60W 2510/10; B60W 2520/26; B60W 2510/082; B60W 2520/06; B60W 2520/10; B60W 2520/28; B60W 2540/10; B60W 2540/12; B60W 2710/083; B60W 10/04; B60W 30/18172;
(Continued)

(56) References Cited

U.S. PATENT DOCUMENTS 8,335,625 B2 * 12/2012 Yamaguchi ............... B60T 8/48
701/87
9,475,396 B2 * 10/2016 Zhang ..................... B60L 15/20
(Continued)

FOREIGN PATENT DOCUMENTS

| JP | 2002186107 A | * | 6/2002 | ............. B60T 8/172 |
| JP | 2004-112973 A | | 4/2004 | |
| WO | WO-2018079469 A1 | * | 5/2018 | ............. B60T 8/172 |

*Primary Examiner* — Fadey S. Jabr
*Assistant Examiner* — Mohamed Abdo Algehaim
(74) *Attorney, Agent, or Firm* — McGinn I.P. Law Group, PLLC.

(57) ABSTRACT

A vehicle slip control apparatus to be installed in a vehicle including a drive source configured to output power to a driving wheel of the vehicle and a gear pair interposed between an output shaft of the drive source and the driving wheel includes a rotating speed detector, a slip determination unit, and a slip determination prohibition unit. The rotating speed detector is configured to detect a rotating speed of the output shaft. The slip determination unit is configured to determine, when an absolute value of an angular acceleration of the rotating speed detected by the rotating speed detector exceeds a set threshold, that the driving wheel is in a slip state. The slip determination prohibition unit is configured to prohibit the determination by the slip determination unit until a predetermined time elapses after a direction of torque outputted from the drive source is inverted.

20 Claims, 8 Drawing Sheets

(51) Int. Cl.
*B60W 10/08* (2006.01)
*B60W 10/10* (2012.01)

(52) U.S. Cl.
CPC ... *B60W 30/18009* (2013.01); *B60W 2510/08* (2013.01); *B60W 2510/10* (2013.01); *B60W 2520/26* (2013.01)

(58) Field of Classification Search
CPC ..... B60W 2520/263; B60W 2520/266; B60W 2520/30; B60W 2520/40; B60W 2520/403; B60W 2520/406; B60W 40/101–107; B60W 30/18009–1888
USPC .......................................................... 701/22
See application file for complete search history.

(56) References Cited

U.S. PATENT DOCUMENTS

| | | | |
|---|---|---|---|
| 9,604,623 B2 * | 3/2017 | Ide ..................... | B60W 10/184 |
| 2003/0036837 A1 * | 2/2003 | Katayama ............... | F16D 48/06 |
| | | | 701/69 |
| 2005/0284679 A1 | 12/2005 | Hommi et al. | |
| 2008/0120006 A1 | 5/2008 | Hommi et al. | |
| 2014/0172209 A1 * | 6/2014 | Ide ..................... | B60W 10/184 |
| | | | 701/22 |
| 2014/0287869 A1 * | 9/2014 | Kato ..................... | B60K 6/547 |
| | | | 477/3 |
| 2015/0120168 A1 * | 4/2015 | Kono ..................... | B60K 28/10 |
| | | | 701/102 |
| 2016/0167662 A1 * | 6/2016 | Kobayashi .......... | B60W 40/068 |
| | | | 701/90 |
| 2016/0318400 A1 * | 11/2016 | Sakaguchi ............... | B60K 6/52 |

\* cited by examiner

VEHICLE SLIP CONTROL APPARATUS

CROSS-REFERENCE TO RELATED APPLICATIONS

The present application claims priority from Japanese Patent Application No. 2019-132561 filed on Jul. 18, 2019, the entire contents of which are hereby incorporated by reference.

BACKGROUND

The technology relates to a vehicle slip control apparatus that determines a slip of a driving wheel and performs control to suppress the slip when determining that a slip has occurred.

Conventionally, vehicles such as automobiles are mounted with a slip control apparatus that determines whether a slip has occurred based on torque output from a drive source such as a motor to a driving wheel and restricts, upon determining that a slip has occurred, the torque to be outputted to the driving wheel.

A technique of determining whether a slip has occurred in the driving wheel (slip determination) based on a change in an angular acceleration of an output shaft of the drive source composed of a motor or the like is known for such a slip control apparatus. On the other hand, when a variation in the torque applied to a drive system is large, the angular acceleration of the output shaft may temporarily show a drastic change even when no slip has occurred.

In order to prevent such an erroneous determination that the driving wheel is in a slip state due to a temporary drastic change of the angular acceleration, in such a kind of slip determination, it is a general practice not to make any slip state determination even when the angular acceleration goes to or beyond a predetermined threshold until the state where the angular acceleration has exceeded the threshold continues for a certain period of time For example, Japanese Unexamined Patent Application Publication No. 2004-112973 discloses a technique of performing slip occurrence time control by prohibiting restrictions on output torque of a motor until a certain time (restriction prohibition time) elapses after a drastic change of motor request torque is detected and determining that a slip has occurred after the restriction prohibition time elapses, if the angular acceleration temporarily exceeds a threshold.

SUMMARY

An aspect of the technology provides a vehicle slip control apparatus to be installed in a vehicle including a drive source configured to output power to a driving wheel of the vehicle and a gear pair interposed between an output shaft of the drive source and the driving wheel. The vehicle slip control apparatus includes a rotating speed detector, a slip determination unit, and a slip determination prohibition unit. The rotating speed detector is configured to detect a rotating speed of the output shaft. The slip determination unit is configured to determine, when an absolute value of an angular acceleration of the rotating speed detected by the rotating speed detector exceeds a set threshold, that the driving wheel is in a slip state. The slip determination prohibition unit is configured to prohibit the determination by the slip determination unit until a predetermined time elapses after a direction of torque outputted from the drive source is inverted.

An aspect of the technology provides a vehicle slip control apparatus to be installed in a vehicle including a drive source configured to output power to a driving wheel of the vehicle and a gear pair interposed between an output shaft of the drive source and the driving wheel including a processor. The vehicle slip control apparatus includes a rotating speed detector configured to detect a rotating speed of the output shaft and circuitry. The rotating speed detector is configured to detect a rotating speed of the output shaft. The circuitry is configured to determine, when an absolute value of the angular acceleration of a rotating speed detected by a rotating speed detector exceeds a set threshold, that the driving wheel is in a slip state. The circuitry is configured to prohibit the determination that the driving wheel is in the slip state until a predetermined time elapses after a direction of torque outputted from the drive source is inverted.

DETAILED DESCRIPTION

When the wheel slips for a certain period of time, it may be difficult for the technique that does not make a slip determination across the board for the certain period of time to perform torque control for slip suppression in quick response.

It is desirable to provide a vehicle slip control apparatus capable of making a determination early and appropriately as to whether the driving wheel has slipped.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
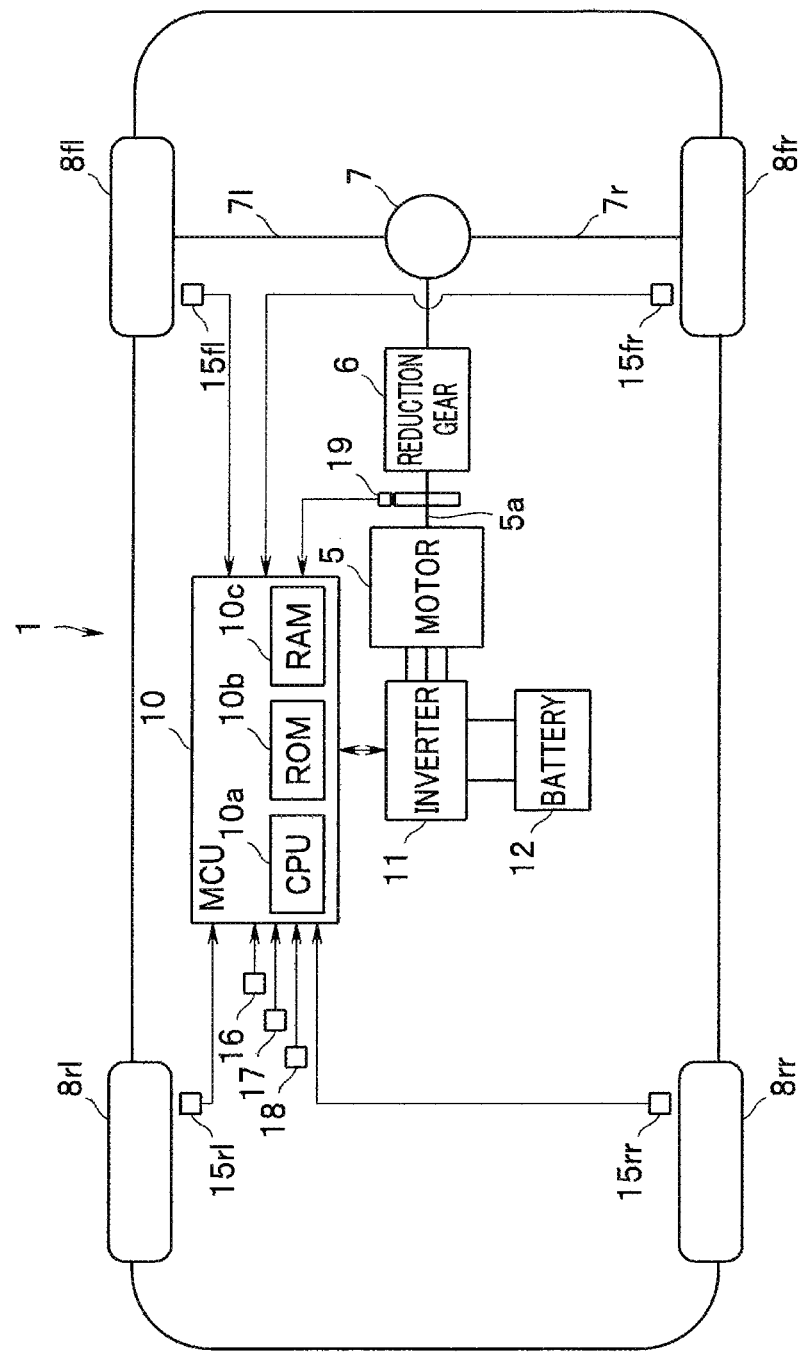
FIG. 1 is a schematic configuration diagram illustrating a drive control system of an electric automobile.

A vehicle 1 illustrated in FIG. 1 is, for example, an electric vehicle (EV) and the vehicle 1 includes a motor generator 5 (hereinafter simply referred to as "motor 5") as a drive source.

A differential apparatus 7 is coupled to an output shaft 5a of the motor 5 via a reduction gear 6. Furthermore, for example, left and right front wheels 8fl and 8fr (hereinafter referred to as "driving wheels 8" as appropriate) are coupled to left and right drive shafts 7l and 7r of the differential apparatus 7 as driving wheels. Note that depending on characteristics of output torque and power consumption efficiency of the motor 5 or the like, the reduction gear 6 can be omitted from the drive system of the vehicle 1 as appropriate and a transmission or the like may be interposed instead of the reduction gear 6.

Here, as is well known, the reduction gear 6 and the differential apparatus 7 include a plurality of gear pairs (not illustrated) and a drive force is transmitted between the motor 5 and the driving wheel 8 by meshing among the respective gear pairs. The respective gear pairs constituting the reduction gear 6 and the differential apparatus 7 include backlashes between mutually meshing gear tooth faces. Such backlash constitutes a gap (play) necessary to cause the gear pairs to rotate smoothly.

Furthermore, the motor 5 is coupled to an output side of a motor control unit (MCU) 10 via an inverter 11. Various sensors such as wheel speed sensors 15fl, 15fr, 15rl and 15rr for detecting rotating speeds of the left and right front wheels 8fl and 8fr and left and right rear wheels 8rl and 8rr, an accelerator sensor 16 for detecting an accelerator pedaling amount, a braking sensor 17 for detecting a brake pedaling amount, a shift position sensor 18 for detecting a position of a shift lever and a motor rotating speed sensor 19 as a rotating speed detector for detecting a rotating speed of the output shaft 5a of the motor 5 are coupled to an input side of the MCU 10.

The MCU 10 is composed of a well-known microcomputer as its principal component including a CPU 10a, a ROM 10b and a RAM 10c or the like. The CPU 10a controls the inverter 11 through PWM control or the like according to a control program stored in the ROM 10b. During power running, the MCU 10 drives the motor 5 by supplying predetermined power to the motor 5 from a battery 12 via the inverter 11. During coast traveling, the MCU 10 causes the motor 5 to generate regenerative torque (negative torque), which is a predetermined regeneration amount, via the inverter 11 to cause the battery 12 to regenerate power.

Through such drive control on the motor 5, the MCU 10 makes a slip determination of the driving wheel 8 based on output from the motor rotating speed sensor 19. That is, the MCU 10 basically calculates an angular acceleration c of the output shaft 5a of the motor 5 based on the output from the motor rotating speed sensor 19 and determines, when the absolute value of the angular acceleration c reaches or exceeds a threshold $\alpha th$, that the driving wheel 8 is in a slip state.

In that case, the MCU 10 monitors a change in an effective value (motor output torque To) of torque outputted to the output shaft 5a from the motor 5. When the direction of the motor output torque To is inverted, the MCU 10 prohibits the slip determination based on the aforementioned angular acceleration c until a set time immediately after the inversion elapses.

In one embodiment, the MCU 10 may serve as a "slip determination unit" and a "slip determination prohibition unit".

Figure 2:
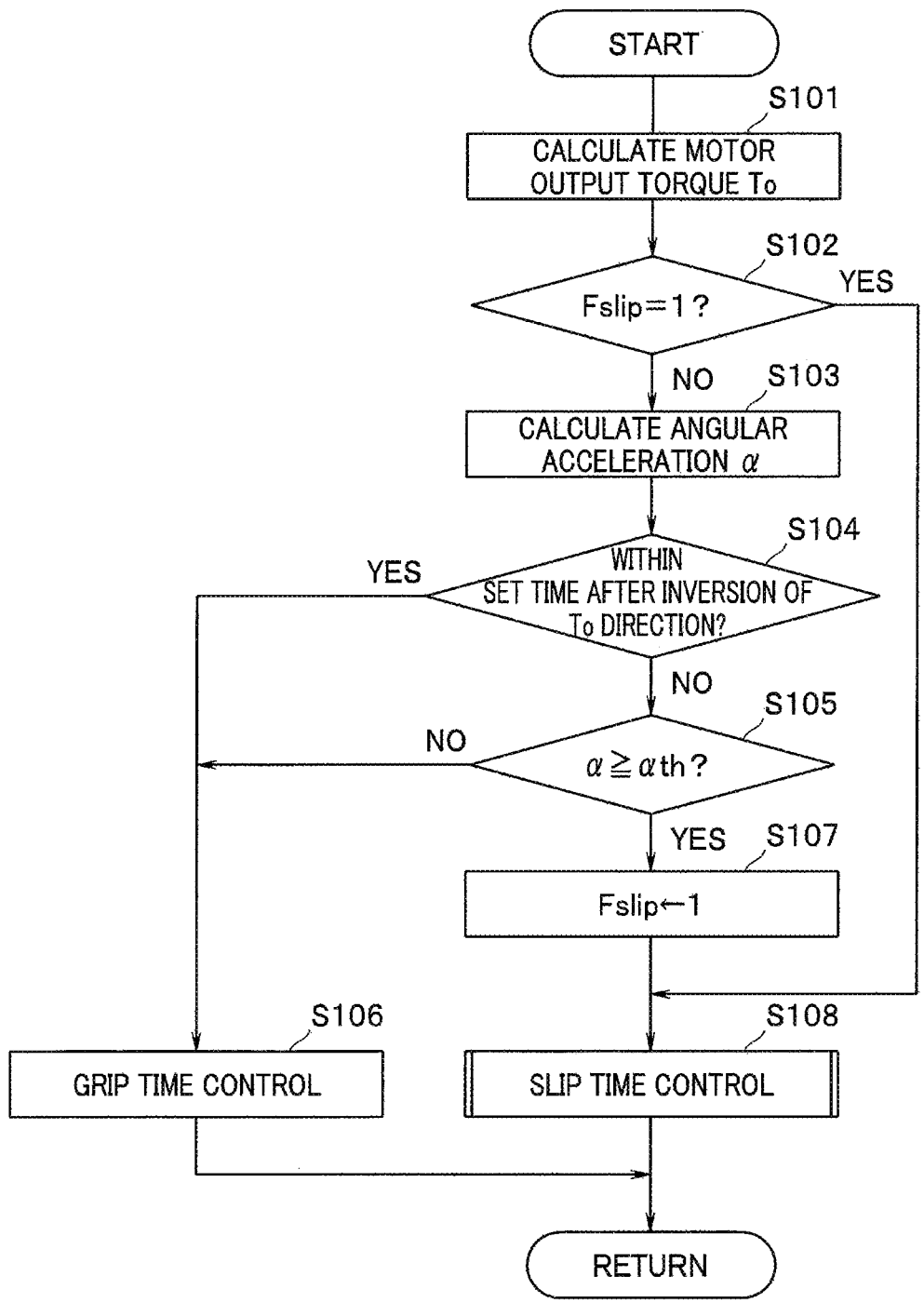
FIG. 2 is a flowchart illustrating a motor drive control routine.

Next, the motor drive control by the aforementioned MCU 10 will be described according to a flowchart of a motor drive control routine illustrated in FIG. 2.

The routine is executed repeatedly at set time intervals and when the routine starts, the MCU 10 calculates the motor output torque To based on a signal of a motor drive current or the like fed back from the inverter 11 in step S101 first.

In following step S102, the MCU 10 examines whether a slip determination flag Fslip is set to "1." Here, the slip determination flag Fslip is a flag that is set to "1" when it is determined that the driving wheel 8 is in a slip state.

When the slip determination flag Fslip is cleared to "0" in step S102, the MCU 10 proceeds to step S103 or when the slip determination flag Fslip is set to "1," the MCU 10 proceeds to step S108.

When the MCU 10 moves from step S102 to step S103, the MCU 10 calculates the angular acceleration $\alpha$ of the output shaft 5a based on the output from the motor rotating speed sensor 19.

In following step S104, the MCU 10 examines whether a current time falls within a set time (predetermined time) $\Delta t$ immediately after the direction of the motor output torque To is inverted based on a history of changes in the motor output torque To calculated in step S101.

When it is determined in step S104 that the current time falls within the set time $\Delta t$ immediately after the direction of the motor output torque To is inverted, the MCU 10 proceeds to step S106.

Figure 4:
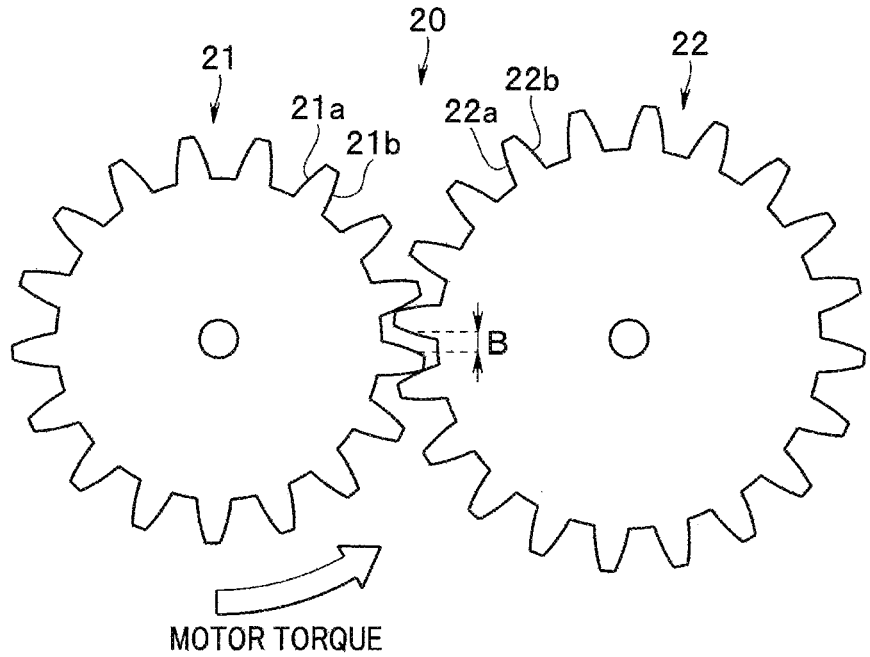
FIG. 4 is a schematic view illustrating a state of a gear pair after experiencing a torque equal to 0 or less.

That is, for example, as illustrated in FIG. 4, since the gear pair 20 is provided with a predetermined backlash B, when the motor output torque To transmitted from the motor 5 to the output shaft 5a experiences 0 or less when the vehicle 1 is stopped, during coast traveling or during backward traveling or the like, a drive tooth face 21a of a drive gear 21 is not in contact with a driven tooth face 22a of a driven gear 22.

In such a condition, when the motor output torque To (that is, motor output torque To larger than 0) in a normal rotation direction is applied from the motor 5 to the output shaft 5a, the drive gear 21 does not receive a reaction force from a road surface through the driven gear 22 until the drive tooth face 21a of the drive gear 21 comes into contact with the driven tooth face 22a of the driven gear 22, and therefore the angular acceleration c temporarily becomes excessive despite the fact that the driving wheel does not slip.

By contrast, when the vehicle 1 is switched from forward traveling to backward traveling, the absolute value of the angular acceleration c temporarily becomes excessive despite the fact that the driving wheel does not slip until the driven tooth face 21b of the drive gear 21 comes into contact with a drive tooth face 22b of the driven gear 22.

Therefore, in such cases, in order to prevent an erroneous determination that the driving wheel is in a slip state, the MCU 10 proceeds to step S106 without making any slip determination in step S105, which will be described later (that is, slip determination is left prohibited).

Here, in the above description, the drive gear 21, the drive tooth face 21a and the driven tooth face 21b of the drive gear 21, the driven gear 22, and the driven tooth face 22a and the drive tooth face 22b of the driven gear 22 are defined based on the action of the gear pair 20 during forward traveling by power running. The set time Δt is set based on experiment or simulation or the like, and is set based on the time required for backlash reducing for backlash B when torque is applied.

On the other hand, when it is determined in step S104 that the current time does not fall within the set time Δt immediately after the direction of the motor output torque To is inverted, the MCU 10 proceeds to step S105 and examines whether the absolute value of the angular acceleration c of the output shaft 5a calculated in step S103 is a predetermined slip determination threshold αth or above.

When it is determined in step S105 that the absolute value of the angular acceleration c is less than the slip determination threshold αth, the MCU 10 determines that the driving wheel 8 is currently not in a slip state and proceeds to step S106.

Figure 5:
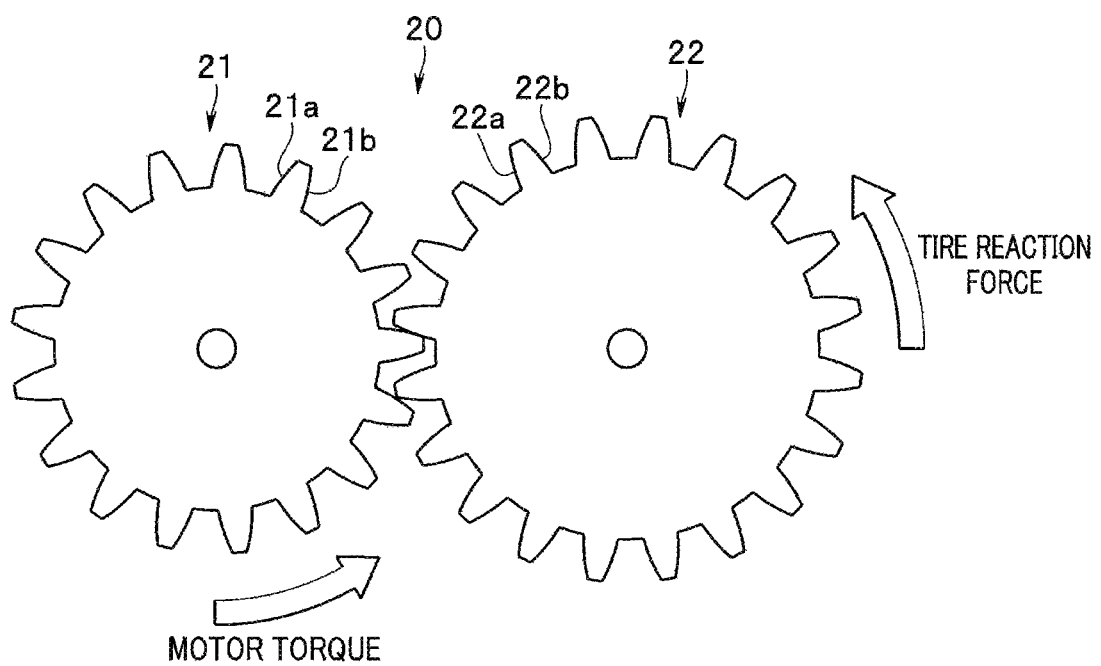
FIG. 5 is a schematic view illustrating a state of the gear pair during steady-state traveling.

That is, for example, as illustrated in FIG. 5, when the drive gear 21 and the driven gear 22 are appropriately meshed and the driving wheel 8 is in a grip state, a reaction force (tire reaction force) from the driving wheel 8 restrains the angular acceleration c from becoming excessive. In such a case, the MCU 10 determines that the driving wheel 8 is not in a slip state.

On the other hand, when it is determined in step S105 that the absolute value of the angular acceleration c is the slip determination threshold αth or above, the MCU 10 determines that the driving wheel 8 is currently in a slip state, proceeds to step S107, sets the slip determination flag Fslip to "1" and then proceeds to step S108.

Figure 6:
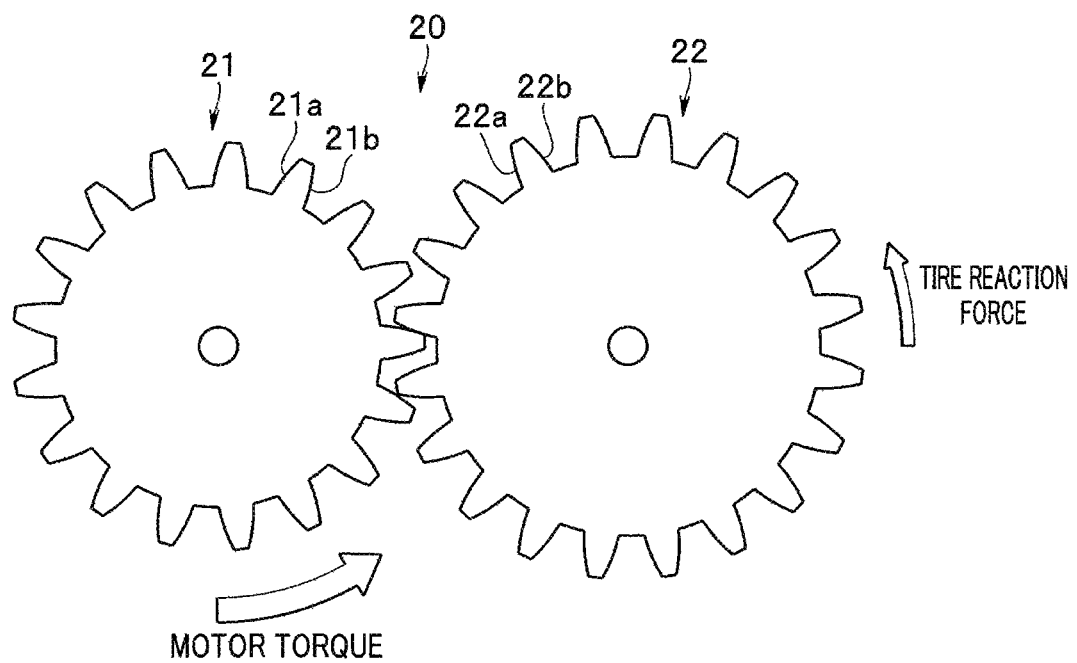
FIG. 6 is a schematic view illustrating a state of the gear pair at the time of a slip.

That is, for example, as illustrated in FIG. 6, even when the drive gear 21 and the driven gear 22 are appropriately meshed, if the driving wheel 8 is in a slip state, since a reaction force (tire reaction force) from the driving wheel 8 is small, the angular acceleration c may become excessive. In such a case, the MCU 10 determines that the driving wheel 8 is in a slip state.

When the MCU 10 proceeds from step S104 or step S105 to step S106, the MCU 10 performs grip time control, which is traveling control during normal operation when the driving wheel 8 has not slipped, and then exits the routine.

Figure 7:
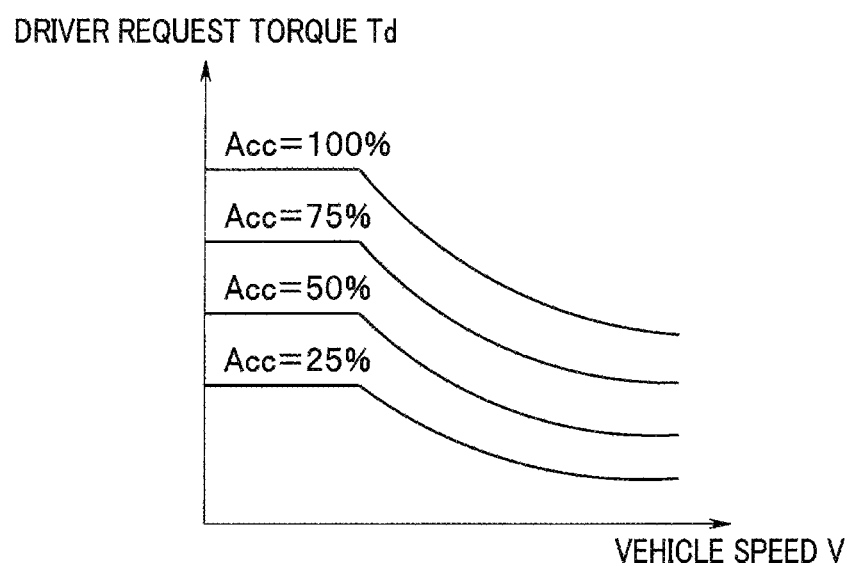
FIG. 7 is a map illustrating a relationship among a vehicle speed, an accelerator opening and a driver request torque.

That is, the MCU 10 calculates a driver request torque Td from a predetermined map (see FIG. 7) based on, for example, a vehicle speed V based on wheel speeds from the respective wheel speed sensors 15fl, 15fr, 15rl and 15rr and an accelerator pedaling amount from the accelerator sensor 16. The MCU 10 calculates a motor instruction torque Tc based on the calculated driver request torque Td and outputs the calculated motor instruction torque Tc to the inverter 11 to thereby perform known motor drive control. Alternatively, when the braking pedal is stepped on, the MCU 10 performs known regeneration control through the inverter 11 based on a signal or the like from the braking sensor 17.

When the MCU 10 proceeds from step S102 or step S107 to step S108, the MCU 10 performs slip time control to cancel the slip state of the driving wheel 8, and then exits the routine.

Figure 3:
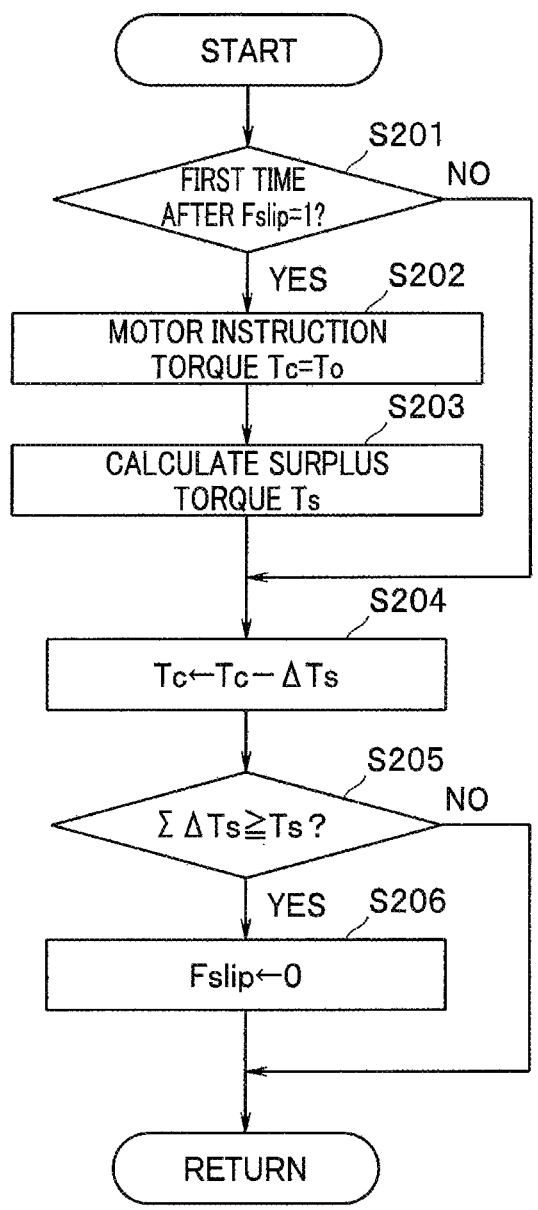
FIG. 3 is a flowchart illustrating a slip time control subroutine.

The slip time control is executed according to a slip time control subroutine illustrated, for example, in FIG. 3. When the subroutine starts, the MCU 10 examines in step S201 whether this is a first time after the slip determination flag Fslip is set to "1."

When the MCU 10 determines that this is a first time after the slip determination flag Fslip is set to "1," the MCU 10 proceeds to step S202 or proceeds to step S204 when the MCU 10 determines that this is not the first time.

When the MCU 10 proceeds from step S201 to step S202, the MCU 10 sets the current motor output torque To as a reference value for the motor instruction torque Tc in the slip time control and calculates a surplus torque Ts which has caused a slip in the driving wheel 8 in following step S203 according to following equation (1).

$$Ts = I \cdot \alpha \quad (1)$$

Here, "I" in equation (1) is inertia inherent to the vehicle 1 and "α" is an angular acceleration when a slip has occurred.

When the MCU 10 proceeds from step S201 or step S203 to step S204, the MCU 10 subtracts a value obtained by subtracting a subtraction value ΔTs predetermined to remove the surplus torque Ts from the current motor instruction torque Tc (Tc←Tc-ΔTs), and then proceeds to step S205.

In step S205, the MCU 10 examines whether a sum total of the subtraction value ΔTs subtracted in step S204 has become the surplus torque Ts or above.

When the MCU 10 determines in step S205 that the sum total of the subtraction value ΔTs is less than the surplus torque Ts, the MCU 10 exits the subroutine as is.

On the other hand, when the MCU 10 determines in step S205 that the sum total of the subtraction value ΔTs has become the surplus torque Ts or above, the MCU 10 determines that the slip state of the driving wheel has been canceled, proceeds to step S206, clears the slip determination flag Fslip to "0" and then exits the subroutine.

According to the embodiment, in the control of making a slip determination that the driving wheel 8 is in a slip state when the absolute value of the angular acceleration α of the output shaft 5a of the motor 5 exceeds the slip determination threshold αth, by only prohibiting the slip determination until the set time Δt immediately after inverting the direction of the motor output torque To transmitted from the motor 5 to the output shaft 5a elapses, it is possible to make a determination as to whether the driving wheel has slipped, early and appropriately.

Figure 8A:
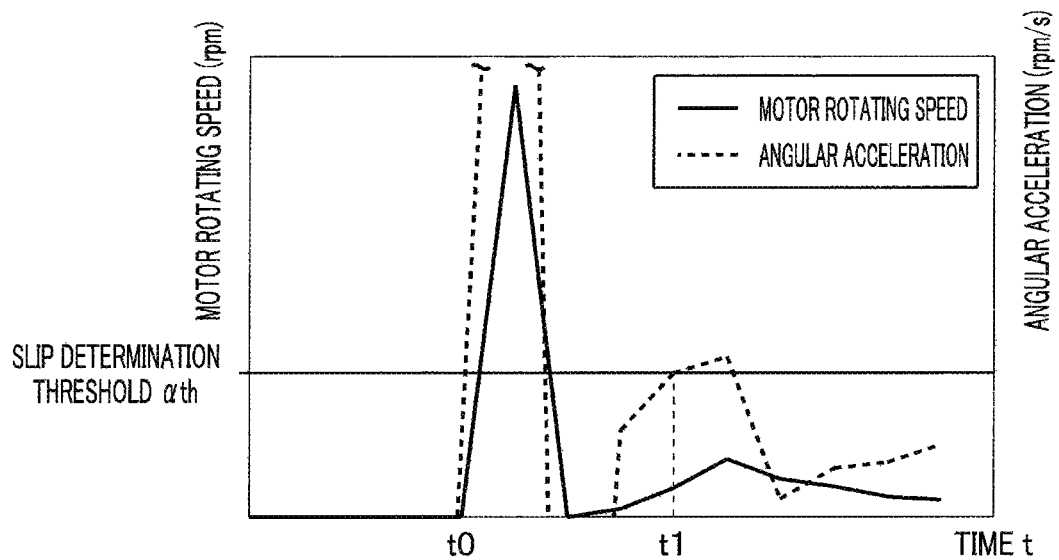
FIG. 8A is a time chart illustrating a motor rotating speed and motor angular acceleration during a slip.
Figure 8B:
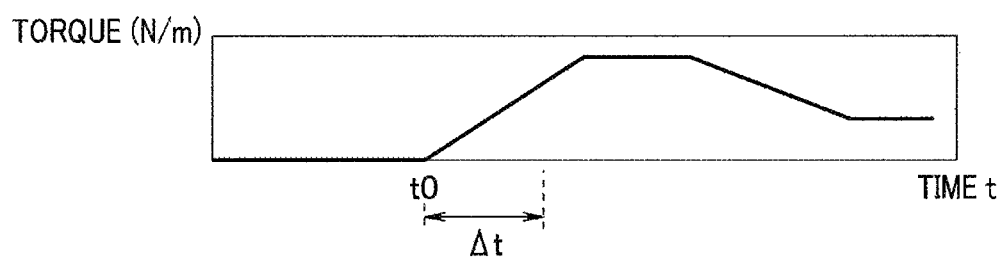
FIG. 8B is a time chart illustrating output torque during slip control.
Figure 8C:
FIG. 8C is a time chart illustrating a slip determination flag.

That is, as illustrated, for example, in FIG. 8A to FIG. 8C, until a set time Δt elapses after the motor output torque To, which is an effective value of torque transmitted from the motor 5 to the output shaft 5a, has changed from a value κ or less to a value greater than 0 (timing t0), by focusing on the fact that the angular acceleration c of the output shaft 5a can become excessive due to a backlash of the gear pair interposed in the drive system from the motor 5 to the driving wheel 8 and by only prohibiting a slip determination until the set time Δt elapses, it is possible to precisely distinguish whether a drastic increase of the angular acceleration c is attributable to a mechanical factor in the drive system or a slip of the driving wheel 8.

Therefore, after the set time Δt elapses, when the angular acceleration α drastically increases and exceeds the slip determination threshold αth, it is possible to immediately determine that the driving wheel 8 is in a slip state (see timing t1 in FIG. 8A and FIG. 8C), and immediately proceed to the slip time control for reducing the surplus torque Ts responsible for the slip (see FIG. 8B).

Figure 9A:
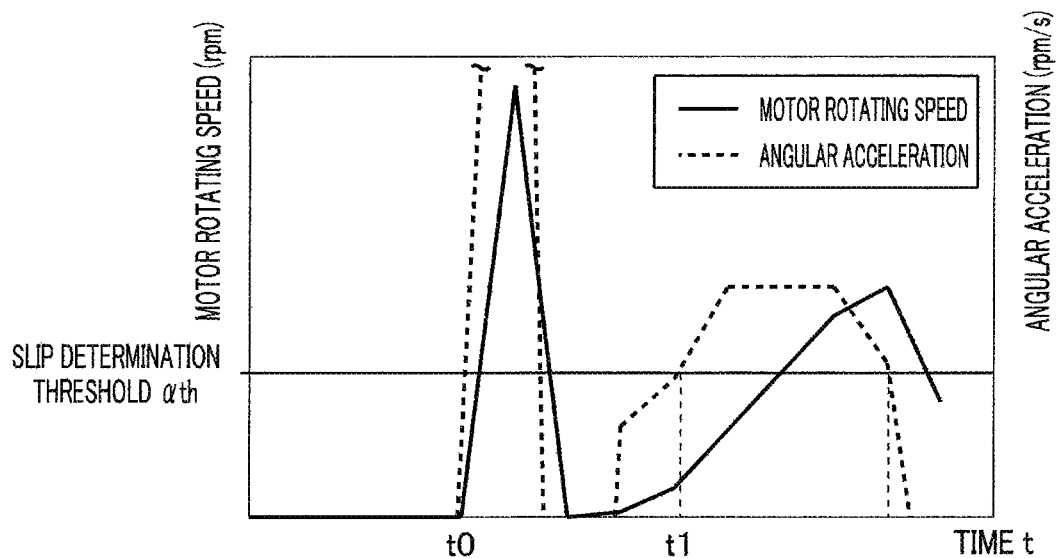
FIG. 9A relates to a comparative example and is a time chart illustrating a motor rotating speed and motor angular acceleration at the time of a slip.
Figure 9B:
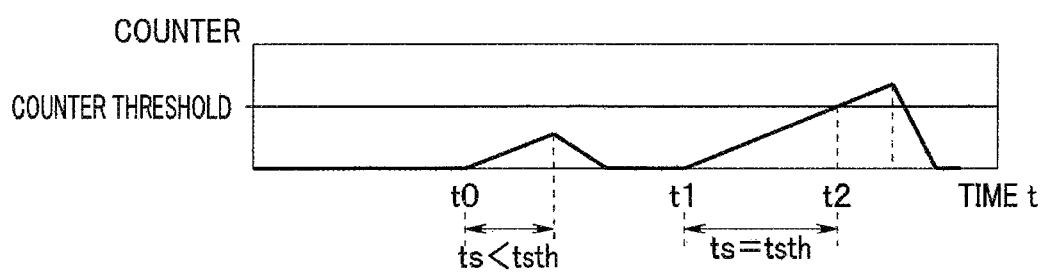
FIG. 9B relates to a comparative example and is a time chart illustrating an elapsed time after an angular acceleration exceeds a threshold.
Figure 9C:
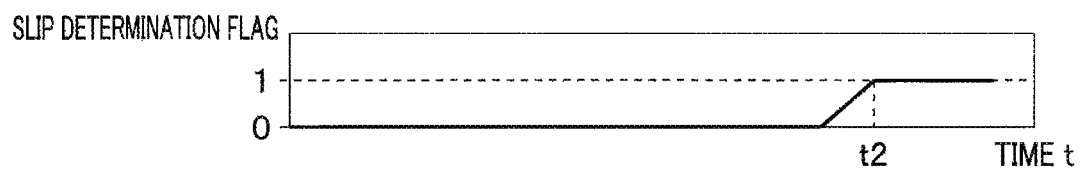
FIG. 9C relates to a comparative example and is a time chart illustrating a slip determination flag.

Here, a comparative example is illustrated in FIG. 9A to FIG. 9C. Slip control in this comparative example is intended to distinguish whether an increase of the angular acceleration c is attributable to a mechanical factor of the drive system or a slip, depending on whether an elapsed time is after the angular acceleration α exceeds the slip determination threshold αth has exceeded a predetermined threshold tsth. Such control does not determine the slip state across the board until the predetermined time tsth elapses (timing t2) after the angular acceleration c exceeds the slip determination threshold αth (timing t1), and so, as is apparent from a comparison with FIG. 8A and FIG. 8C, the time to determine the slip state is delayed compared to the control according to the present embodiment.

According to the vehicle slip control apparatus of the technology, it is possible to make a determination as to whether the driving wheel has slipped, early and appropriately.

Note that although an example has been described in the aforementioned embodiment where a motor generator is used as the drive source, the technology is not limited to this, but, for example, it is also possible to adopt an engine or a configuration using an engine and a motor generator together as the drive source.

The motor control unit 10 provided in the vehicle slip control apparatus illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the motor control unit 10 having functions as the slip determination unit and the slip determination prohibition unit. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle slip control apparatus to be installed in a vehicle comprising a drive source configured to output power to a driving wheel of the vehicle and a gear pair interposed between an output shaft of the drive source and the driving wheel, the vehicle slip control apparatus comprising:
   a rotating speed sensor configured to detect a rotating speed of the output shaft;
   at least one processor configured to:
   determine, when an absolute value of an angular acceleration of the rotating speed detected by the rotating speed sensor exceeds a set threshold, that the driving wheel is in a slip state; and
   prohibit the determination that the driving wheel is in the slip state until a predetermined time elapses after a direction of torque outputted from the drive source is inverted.

2. The vehicle slip control apparatus according to claim 1, wherein
   the at least one processor is configured to prohibit the determination that the driving wheel is in the slip state until the predetermined time elapses after a value of torque outputted from the drive source is changed from a value of 0 or less to a value greater than 0.

3. The vehicle slip control apparatus according to claim 1, wherein the at least one processor examines whether a current time falls within the predetermined time after the direction of the torque of the drive source is inverted based on a history of changes in the torque of the drive source that is calculated.

4. The vehicle slip control apparatus according to claim 1, wherein when it is determined that a current time does not fall within the predetermined time after the direction of the torque outputted from the drive source is inverted, the at least one processor is configured to examine whether the absolute value of the angular acceleration of the output shaft of the drive source calculated is at the set threshold or above.

5. The vehicle slip control apparatus according to claim 1, wherein when it is determined that a current time does not fall within the predetermined time after the direction of the torque outputted from the drive source is inverted, the at least one processor is further configured to:
   when the at least one processor determines the absolute value of the angular acceleration is less than the set threshold, the at least one processor is configured to determine that the driving wheel is currently not in the slip state, and
   when the at least one processor determines that the absolute value of the angular acceleration is the set threshold or above, the at least one processor is configured to determine that the driving wheel is currently in the slip state.

6. The vehicle slip control apparatus according to claim 1, wherein when the at least one processor determines that the driving wheel is currently in the slip state, then the at least one processor is configured to perform a slip time control according to a calculated surplus torque of the drive source which has caused a slip in the driving wheel.

7. The vehicle slip control apparatus according to claim 1, wherein the at least one processor is configured to perform a grip time control comprising a traveling control during normal operation when the driving wheel has not slipped, when the current time is within the predetermined time after inversion of the direction of the torque outputted from the drive source.

8. A vehicle slip control apparatus to be installed in a vehicle comprising a drive source configured to output power to a driving wheel of the vehicle and a gear pair interposed between an output shaft of the drive source and the driving wheel, the vehicle slip control apparatus comprising a processor, the vehicle slip control apparatus comprising
   a rotating speed sensor configured to detect a rotating speed of the output shaft; and
   circuitry configured to
   determine, when an absolute value of an angular acceleration of the rotating speed detected by the rotating speed sensor exceeds a set threshold, that the driving wheel is in a slip state, and
   prohibit the determination that the driving wheel is in the slip state until a predetermined time elapses after a direction of torque outputted from the drive source is inverted.

9. The vehicle slip control apparatus according to claim 8, wherein the circuitry is configured to prohibit the determination that the driving wheel is in the slip state until the predetermined time elapses after a value of torque outputted from the drive source is changed from a value of 0 or less to a value greater than 0.

10. The vehicle slip control apparatus according to claim 8, wherein the circuitry is configured to examine whether a current time falls within the predetermined time after the direction of the torque of the drive source is inverted based on a history of changes in the torque of the drive source that is calculated.

11. The vehicle slip control apparatus according to claim 8, wherein when it is determined that a current time does not fall within the predetermined time after the direction of the torque outputted from the drive source is inverted, the circuitry is configured to examine whether an absolute value of the angular acceleration of the output shaft of the drive source calculated is at the set threshold or above.

12. The vehicle slip control apparatus according to claim 8, wherein when it is determined that a current time does not fall within the predetermined time after the direction of the torque outputted from the drive source is inverted, the circuitry is further configured to:
   when it is determined that the absolute value of the angular acceleration is less than the set threshold, determine that the driving wheel is currently not in the slip state, and
   when it is determined that the absolute value of the angular acceleration is a slip determination threshold or above, determine that the driving wheel is currently in the slip state.

13. The vehicle slip control apparatus according to claim 8, wherein when the circuitry determines that the driving wheel is currently in the slip state, then the circuitry is configured to perform a slip time control according to a calculated surplus torque of the drive source which has caused a slip in the driving wheel.

14. The vehicle slip control apparatus according to claim 8, wherein the circuitry is further configured to perform a grip time control comprising a traveling control during normal operation when the driving wheel has not slipped, when the current time is within the predetermined time after inversion of the direction of the torque outputted from the drive source.

15. A non-transitory computer readable medium storing computer executable instructions, the computer executable instructions comprising:
   determining, when an absolute value of an angular acceleration of a rotating speed of an output shaft of a drive source detected by a rotating speed sensor exceeds a set threshold, that a driving wheel receiving output power form the drive source is in a slip state; and
   prohibiting the determination that the driving wheel is in the slip state until a predetermined time elapses after a direction of torque outputted from the drive source is inverted.

16. The non-transitory computer readable medium according to claim 15, wherein the computer executable instructions further comprising prohibiting the determination that the driving wheel is in the slip state until the predetermined time elapses after a value of torque outputted from the drive source is changed from a value of 0 or less to a value greater than 0.

17. The non-transitory computer readable medium according to claim 15, wherein the computer executable instructions further comprising examining whether a current time falls within the predetermined time after the direction of the torque of the drive source is inverted based on a history of changes in the torque of the drive source that is calculated.

18. The non-transitory computer readable medium according to claim 15, wherein the computer executable instructions further comprising when it is determined that a current time does not fall within the predetermined time after the direction of the torque outputted from the drive source is inverted, examining whether the absolute value of the angular acceleration of the output shaft of the drive source calculated is at the set threshold or above.

19. The non-transitory computer readable medium according to claim 15, wherein when it is determined that a current time does not fall within the predetermined time after the direction of the torque outputted from the drive source is inverted, the computer executable instructions further comprising:
   when it is determined that the absolute value of the angular acceleration is less than the set threshold, determining that the driving wheel is currently not in the slip state, and
   when it is determined that the absolute value of the angular acceleration is the set threshold or above, determining that the driving wheel is currently in the slip state.

20. The non-transitory computer readable medium according to claim 15, wherein the computer executable instructions further comprising:
   when it is determined that the driving wheel is currently in the slip state, then performing a slip time control according to a calculated surplus torque of the drive source which has caused a slip in the driving wheel; and
   performing a grip time control comprising a traveling control during normal operation when the driving wheel has not slipped, when a current time is within the predetermined time after inversion of the direction of the torque outputted from the drive source.

* * * * *